Our invention relates to a novel fluid conducting washer or bearing structure, and more specifically relates to a novel compact arrangement which can be directly connected to a body and serves as a highly efficient heat sink or heat source for controlling the temperature of the body.

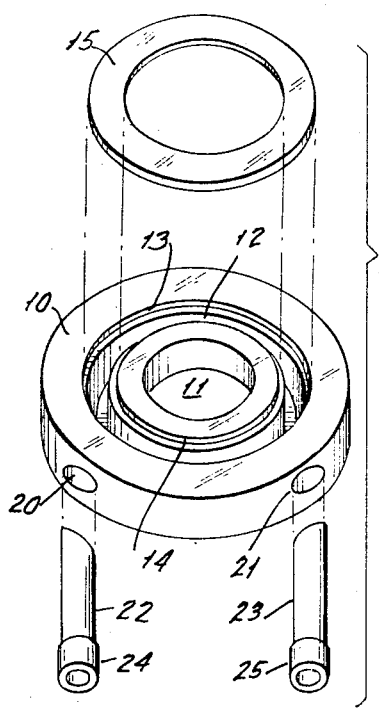
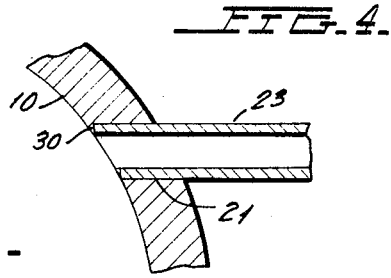
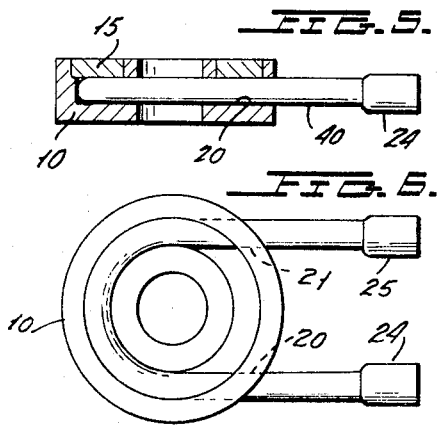
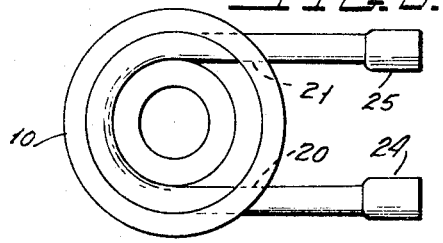
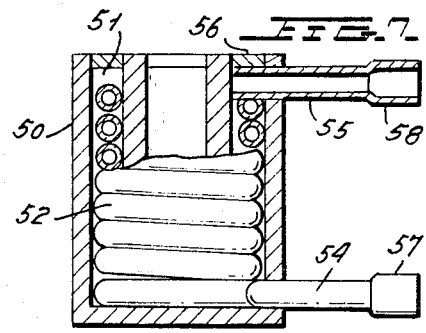
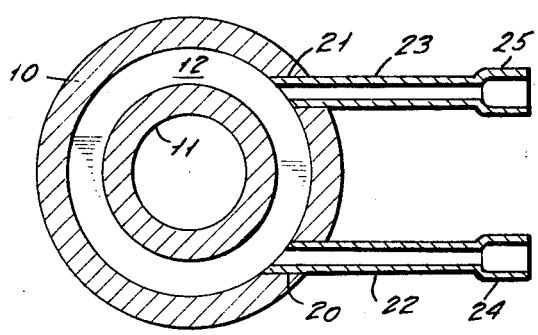
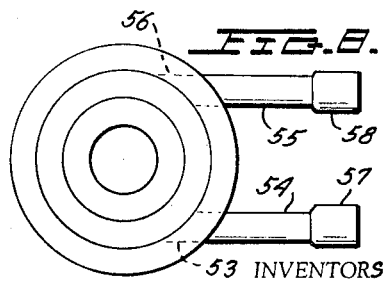
INVENTORS
JOSEPH F. MATARESE
PAUL F. WAIVERS
BY
OSTROLENK, FABER, GERB & SOFFEN
ATTORNEYS 3,267,997
FLUID COOLED WASHER
Joseph F. Matarese, Burlington, and Paul F. Waivers, Florence, N.J., assignors to Aero-Chatillon Corporation, a corporation of New York
Filed Sept. 20, 1962, Ser. No. 225,014
1 Claim. (Cl. 165—168)

A primary object of this invention is to provide a novel low mass fluid cooled washer which can be attached to another member.

A further object of this invention is to provide an extremely efficient removable and replaceable heat sink or heat source.

Another object of this invention is to provide a novel fluid cooled washer which includes a conduit-receiving body which can be directly secured adjacent a heated body for cooling the body.

Another object of this invention is to provide a novel bearing structure which has a heat exchange medium conducting coil embedded therein in a novel and simplified manner.

These and other objects of our novel invention will become apparent from the following description when taken in connection with the drawings, in which:

FIGURE 1 shows an exploded perspective view of a fluid cooled washer constructed in accordance with the present invention.

FIGURE 2 shows a side cross-sectional view through the washer body of FIGURE 1.

FIGURE 3 shows a cross-sectional view of FIGURE 2 taken across the lines 3—3 in FIGURE 2.

FIGURE 4 is an enlarged view illustrating the manner in which an opening is machined into the washer body for receiving one of the tubular conduits.

FIGURE 5 shows a partially cut away view of a washer formed in accordance with the second embodiment of the invention.

FIGURE 6 is a top view of the washer of FIGURE 5 with the cover removed.

FIGURE 7 is a partially cut away view of a further embodiment of the invention wherein a multiturn conduit is used.

FIGURE 8 is a top view of the washer of FIGURE 7.

Referring now to FIGURES 1 through 4, I have illustrated therein a washer which could be used as a bearing and which could be connected to a heated body whereby the washer serves as a heat sink for the body.

More specifically, the washer is comprised of annular body 10 which has an opening 11 extending therethrough. Opening 11 can serve to receive securing means for securing the complete assembly to a heated body which is to be cooled. While the following description is with reference to the cooling of a heated body, it will be apparent that the novel structure can also operate to conduct a heated fluid.

The body 10 has an annular groove 12 machined therein with the upper inner portion of groove 12 machined to form a first shoulder 13 and the outer upper portion of the groove machined to form a second shoulder 14. The first and second shoulders 13 and 14 serves as a seat for the annular cover 15 which fits snuggly between shoulders 13 and 14 and has a height substantially equal to the height of these shoulders.

Two openings 20 and 21 are then machined through the outer wall of body 11 and receive conduits 22 and 23, respectively. As best shown in FIGURE 3, the conduits 22 and 23 can, if desired, be terminated by nipples 24 and 25, respectively, of a larger diameter than conduits 22 and 23 and serve to receive fluid fittings.

In order to adapt opening 20 and 21 to receive conduits 22 and 23 respectively, while drilling the openings, it is preferable that the opening is not drilled completely through the wall of member 10.

Thus, as shown in FIGURE 4, the opening is drilled from the outside of body 10 and stops at the shoulder portion 30. The shoulder portion 30 serves as a stop for the extending edge of the tapered end of conduit 23. Thus, the conduit 23 is automatically properly aligned and cannot accidentally extend into the cylindrical body opening defined between annular groove 12 and cover 15. This flush fitting is desirable since it prevents undue fluid restriction in the fluid flow channel.

In order to assemble the various elements, which may each be made of any desired material such as stainless steel, the complete assembly may be first placed together as shown and is thereafter brazed together as a unit by a so-called "Nitro-brazing" technique. This type of brazing technique is described as the AMS 2675 process where an AMS 4777 filler material is used. Thus, a low melting alloy material is packed between the elements which are to be secured together and the complete assembly is placed in a dry hydrogen atmosphere and is brought to a brazing temperature which could be of the order of 1900° when an AMS type 4777 filler material is used. This temperature is retained for approximately ½ hour.

In operation, the unit can be connected to some device which requires a heat sink and is connected to the heat sink as by a bolt which passes through opening 11. A gas or fluid is then injected into one of conduits 22 and 23 and circulates through chamber 12 and comes out of the other of the conduits.

While the embodiment of FIGURES 1 through 4 show the conduit portions 22 and 23 as terminating in channels 20 and 21, it is possible to have a complete conduit circulate completely around the channel formed in body 10. By way of example, and as shown in FIGURES 5 and 6 a conduit 40 can be forced through opening 20 until its end extends through opening 21. Thereafter, fittings such as fittings 24 and 25 may be placed on the ends of the single conduit 40 while the cover 15 is brazed to body 10. During the brazing, the entire surface of conduit 40 is thermally connected to the interior of the chamber 12.

A further embodiment of the invention is set forth in FIGURES 7 and 8 for a case where greater heat change is required.

Referring to FIGURES 7 and 8, the body of the device is formed of an elongated body 50 which has an elongated circular channel 51 therein. A coiled tube 52 having as many turns as required is then dropped into channel 51 as illustrated. Thereafter a conduit 54 is inserted through an opening 53 in the wall of housing 50 to mate with the lower ends of coil 52.

In a similar manner, a conduit 55 is inserted through opening 56 in housing 50 and mates with the upper end of coil 52. Thereafter, the cover 56 is put in position and the complete assembly is thereafter brazed as a single unit.

If desired, fittings such as fittings 57 and 58 can be applied to conduits 54 and 55, respectively.

Although I have described preferred embodiments of my novel invention, many variations and modifications will now be obvious to those skilled in the art, and I prefer therefore to be limited not by the specific disclosure herein but only by the appended claims.

The embodiments of the invention in which an exclusive privilege or property is claimed are defined as follows:

A washer comprising a disk having an annular channel extending from a surface thereof, a first and second opening extending from respective first and second portions of said channel to respective first and second exterior regions of said disk; said first and second openings receiving first and second conduit means therein for forming a circulation path for a heat exchange fluid from said first conduit, through said channel and to said second conduit; said first and second openings in said first and second conduits extending in the plane of said disk; said first and second conduits being parallel to one another; the ends of said first and second conduits adjacent said channel being flush with the wall of said first and second openings having respective internal shoulders for receiving portions of said ends of said first and second conduits, respectively, and a disk shaped cover enclosing said channel at the surface thereof extending through said disk.

References Cited by the Examiner

UNITED STATES PATENTS

| | | | |
|---|---|---|---|
| 394,056 | 12/1888 | Cameron | 308—77 |
| 454,665 | 6/1893 | Prendergrast | 165—169 |
| 1,324,886 | 12/1919 | Eisler | 308—77 |
| 1,634,968 | 7/1927 | Weinberg | 165—52 |
| 2,119,922 | 6/1938 | Lutz | 261—144 |
| 2,306,808 | 12/1942 | Hutchings | 165—168 |
| 2,811,761 | 11/1957 | Bauer | 165—168 |
| 2,928,698 | 3/1960 | Feighofen | 308—77 |

OTHER REFERENCES

German printed application No. 1,074,915, printed February 1960.

ROBERT A. O'LEARY, *Primary Examiner.*

CHARLES SUKALO, FREDERICK L. MATTESON, *Examiners.*